United States Patent [19]
Mahr

[11] Patent Number: 5,730,862
[45] Date of Patent: Mar. 24, 1998

[54] BAR SCREEN WITH ROTATING RAKES

[76] Inventor: Gernot Mahr, Kupferschmiedgasse 8, A-2201 Hagenbrunn, Austria

[21] Appl. No.: 324,408

[22] Filed: Oct. 17, 1994

[51] Int. Cl.$^6$ ............................................. B01D 29/62
[52] U.S. Cl. ........................... 210/91; 210/159; 210/162; 210/413
[58] Field of Search ................. 210/159, 162, 210/413, 498, 499, 91, 746, 791

[56] References Cited

U.S. PATENT DOCUMENTS

| | | | |
|---|---|---|---|
| 828,715 | 8/1906 | Cook | 210/499 |
| 2,128,348 | 8/1938 | Briggs | 210/159 |
| 2,671,563 | 3/1954 | Benner, Jr. | 210/159 |
| 2,684,157 | 7/1954 | Tolman | 210/159 |
| 2,978,105 | 4/1961 | Poheim | 210/159 |
| 3,347,382 | 10/1967 | Quast | 210/159 |
| 3,464,558 | 9/1969 | Harvnek et al. | 210/159 |
| 4,055,497 | 10/1977 | Creps et al. | 210/91 |
| 4,107,040 | 8/1978 | Rudolph et al. | 210/159 |
| 4,283,278 | 8/1981 | Savage et al. | 210/498 |
| 4,289,619 | 9/1981 | Sampson | 210/159 |
| 4,472,273 | 9/1984 | Hagihara | 210/162 |
| 4,521,306 | 6/1985 | Day | 210/159 |
| 4,780,199 | 10/1988 | Ezzell et al. | 210/162 |
| 5,032,263 | 7/1991 | Rudzinski | 210/159 |
| 5,034,122 | 7/1991 | Wiesemann | 210/162 |
| 5,167,803 | 12/1992 | Newton et al. | 210/159 |

OTHER PUBLICATIONS

"1-phase alternating current CIH3X", Technical Data.

*Primary Examiner*—Christopher Upton
*Attorney, Agent, or Firm*—Laurence A. Greenberg; Herbert L. Lerner; Werner H. Stemer

[57] ABSTRACT

A mechanically raked screen system is used for preliminary waste water treatment. A screen is formed of a multiplicity of mutually parallel screen bars. The screen bars are oriented substantially transversely relative to a flow direction of a flowing liquid and forming screen spaces of a given width therebetween. A rake assembly rakes the screenings from the screen. The rake assembly includes two endless chains which traveling about sprocket wheels disposed laterally of the screen, and a rake attached to and extending between the chains. The rake is oriented substantially perpendicularly to the screen and travels with the chains for repeatedly raking the screen. The tynes of the rake are integrally formed from a single metal piece together with the rake plate. The vertical screen bars have a trapezoidal cross section, such that the leading side facing against the flow of the waste water is about twice as wide as the trailing side.

3 Claims, 6 Drawing Sheets

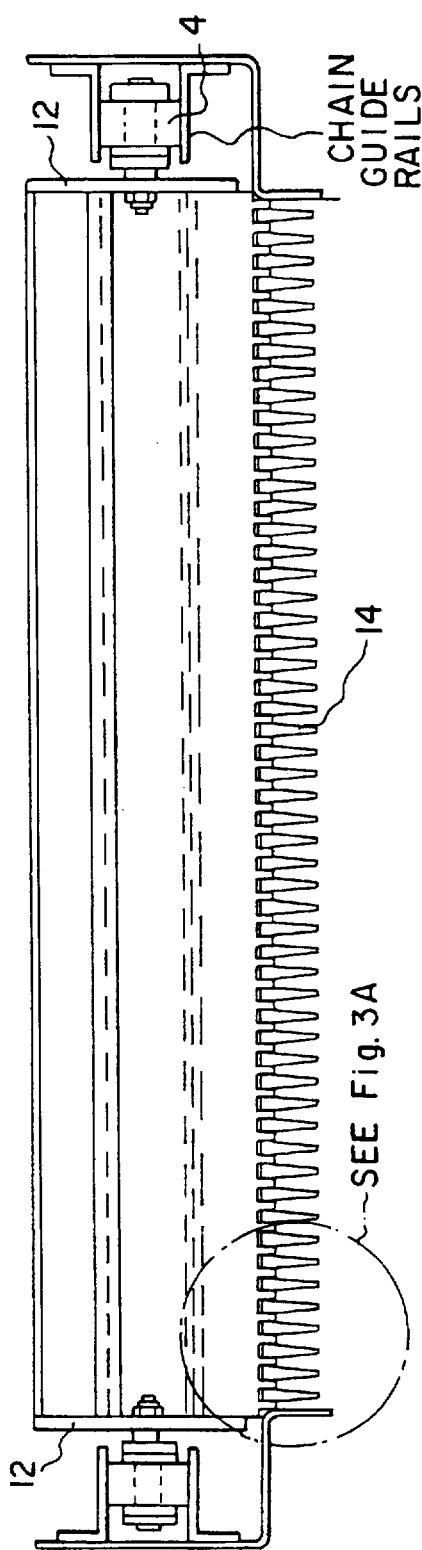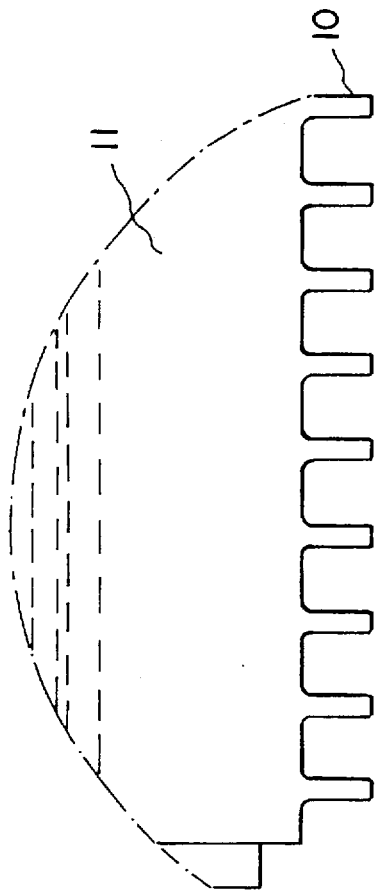

BAR SCREEN WITH ROTATING RAKES

BACKGROUND OF THE INVENTION

1. Field of the Invention

The invention relates to a bar screen for screening solid waste from a flowing liquid, such as waste water, with a rake assembly which rakes the solid waste from the screen and delivers the screening to an apparatus which disposes of the solid waste. The invention is particularly applicable in the mechanical treatment, i.e. the preliminary clarification, of waste water.

2. Description of the Related Art

U.S. Pat. No. 4,107,040 to Rudolph et al. describes a water conduit screen and a drive device for the raking assembly. That screen is raked, or combed, from the downstream side of the screen, in that the tynes project onto the solid materials collecting side. As the rake is moved upwardly, the tynes entrain the solid screenings and, once the rake mechanism reaches a level above the screen, it is caused to discharge the solids into a collecting bin. The rake is then returned to the bottom of the water conduit, where it again engages the screen and starts another raking cycle.

U.S. Pat. No. 4,289,619 to Sampson pertains to a front-raked screen. A single rake, the tynes of which engage into the vertical spaces formed in the screen, is caused to reciprocate along the screen and to rake the solids into a collecting bin and on to a comminutor. The screen is inclined relative to the vertical approximately 45°.

The filter lift system described in U.S. Pat. No. 4,472,273 to Hagihara pertains to a back-raked system as described by Rudolph et al., with a substantially single-stroke raking system.

U.S. Pat. No. 4,521,306 to Day describes a rotating rake system with a plurality of travelling rakes on a continuous chain. The rakes are formed of polyurethane for improved corrosion resistance, and the tynes are integrally formed on a backplate which is supported on a transverse angle bar. The vertical screen bars are formed of round metal rods.

All of the prior art devices have in common that their raking process is a relatively crude reciprocating sweep of the screen or a traveling motion on a continuous chain. The prior art teachings do not allow sufficiently small mesh screens with correspondingly narrow, yet rigid, tynes.

SUMMARY OF THE INVENTION

It is accordingly an object of the invention to provide a bar screen with rotating rakes, which overcomes the hereinafore-mentioned disadvantages of the heretofore-known devices of this general type and which allows screens of a very narrow mesh size and correspondingly sized rakes with accurately meshing tynes. It is also an object to provide a drive system for the raking mechanism which responds to clogging with a controlled reciprocating motion.

With the foregoing and other objects in view there is provided, in accordance with the invention, a mechanically raked screen system for removing solids from a flowing liquid, comprising:

a screen of a multiplicity a mutually parallel screen bars, the screen bars being oriented substantially transversely relative to a flow direction of a flowing liquid and forming screen spaces of a given width therebetween;

a rake assembly for raking solids from the screen, the rake assembly including two endless chains traveling about sprocket wheels disposed laterally of the screen, a rake attached to and extending between the chains, the rake being oriented substantially perpendicularly to the screen and traveling with the chains for repeatedly raking the screen;

the rake having tynes integrally formed and protruding into the screen spaces, the rake and the tynes being formed from a single metal component.

In accordance with another feature of the invention, the screen bars are trapezoidal as seen in a horizontal cross section, having a wider side thereof facing against a flow direction of a liquid flowing through the screen and tapering towards a narrower side thereof as seen in the flow direction.

In accordance with a further feature of the invention, the wider side of the trapezoidal screen bars have a width approximately double a width of the narrower side thereof.

With the foregoing and other objects in view there is also provided, an improvement in a method of cleaning solid waste from a flow of soiled liquid. The method is performed with an apparatus comprising a screen of a multiplicity a mutually parallel screen bars, in which the screen bars are oriented substantially transversely relative to a flow direction of the soiled liquid and form screen spaces of a given width therebetween; wherein the solids collected at the screen are raked upwardly with a rake assembly which includes two endless chains traveling about sprocket wheels disposed laterally of the screen and a rake attached to and extending between the chains, wherein the rake is oriented substantially perpendicularly to the screen and travels with the chains for repeatedly raking the screen. The improvement comprises the following steps:

providing a sensor system for determining whether or not the rake has been stopped at an obstacle by means of measuring an overload of the motor driving the chains; and repeatedly reversing a direction of travel of the rake until a measurement of the overload indicates that the obstacle has been removed.

In summary, the traveling bar screen system according to the invention is distinguished in the following advantages:

Substantial reduction in construction costs for screen containment due to reduction in overall height;

low operational and maintenance costs due to high performance and efficiency;

foolproof system with electronic overload monitoring and simple kinematic system;

substantially improved durability due to low number of moving parts without painted or covered materials; the entire system is formed of stainless steel, with the chains being formed of tempered steel;

high reserve capacity with raking intervals of about six seconds (instead of two minutes in the reciprocating rake system); and maintenance-free bearings made from polyethylene (no lubrication required).

Other features which are considered as characteristic for the invention are set forth in the appended claims.

Although the invention is illustrated and described herein as embodied in a bar screen with rotating rakes, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 3 is a partial top-plan view of the rake assembly according to the invention;

FIG. 3A is on enlarged view of the circled detail of FIG.3;

DESCRIPTION OF THE PREFERRED EMBODIMENTS

Figure 1:
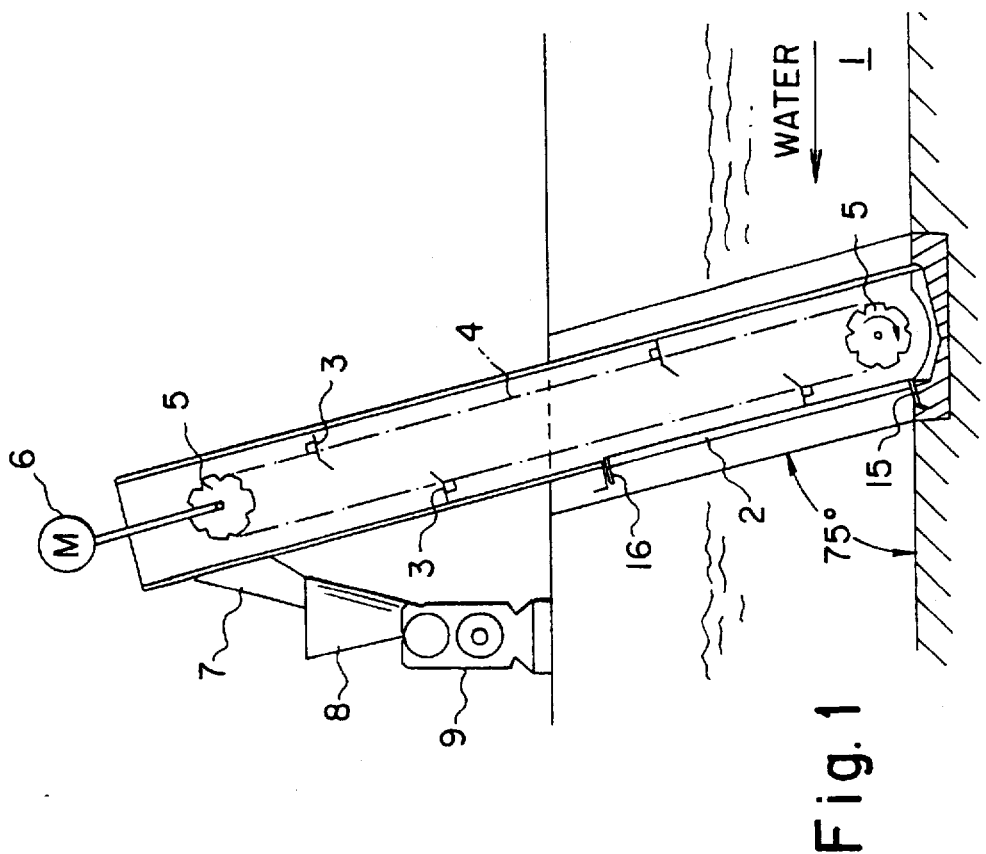
FIG. 1 is a diagrammatic side-elevational view of the bar screen assembly according to the invention.

Referring now to the figures of the drawing in detail and first, particularly, to FIG. 1 thereof, there is seen a water channel 1 in which the water flows in the direction of the arrow. Solids are collected at a screen 2 and the screenings are raked upwardly from the screen with a plurality of rakes 3. The screen makes a angle relative to the vertical of approximately 15°. The rakes 3 are disposed on an endless chain 4 which travels about sprocket wheels 5, which rotate in a clockwise direction. The upper sprocket wheel 5 is driven by a motor 6. The screenings which are raked from the screen 2 are lifted upwardly by the respective rake 3. When the rake 3 reaches a scraper mechanism (FIG. 8), the screenings are brushed from the rake 3 and caused to fall through a chute 7 and 8 into a screenings bale press 9. The bale press 9 (screwpress, snailpress) is used for dewatering the screenings and for reducing the volume of the collected material. The screenings bale press is commercially available from Mahr Maschinenbau of Vienna, Austria.

Figure 2:
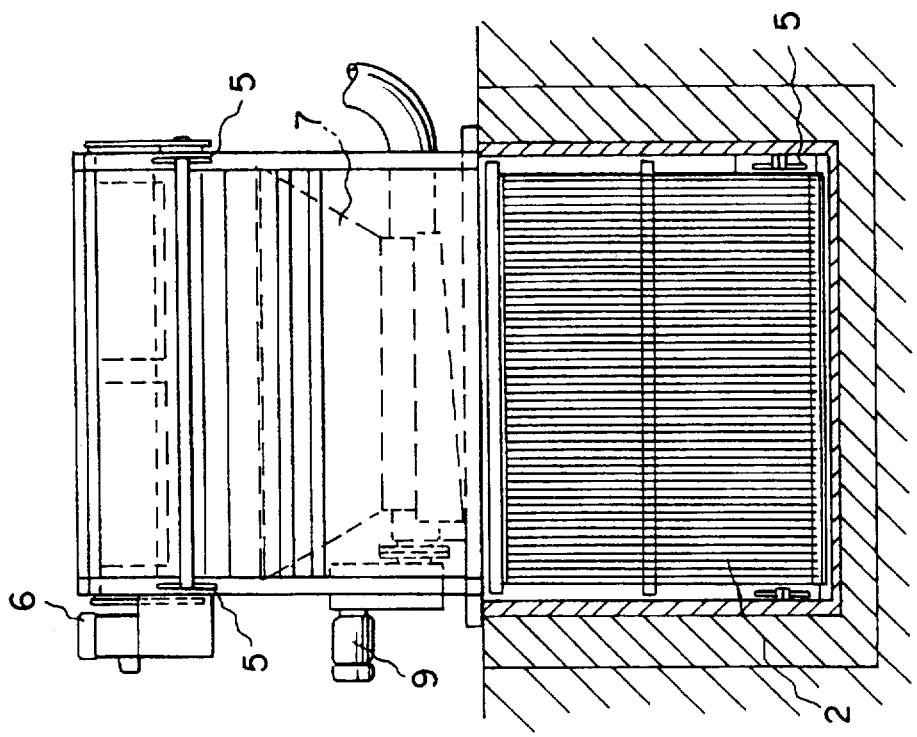
FIG. 2 is a front-elevational view thereof.

FIG. 2 shows the assembly of FIG. 1 in front elevation.

Referring now to FIG. 3, the rake 3 has a multiplicity of tynes 10 which have been cut directly from the material of a rake plate 11. Depending on the spacing of the screen 2, the tynes 10 have a typical width of between 4 mm and 8 mm. These small measurements make it virtually impossible to attach tynes to the rake plate 11 and still obtain the necessary accuracy and rigidity. Accordingly, the tynes 10 of this invention are laser or plasma-machined from the rake plate. Typically, I have used a plasma cutter of Thermadyne, Thermal Dynamics (StakPak CM 6030 S/N+2× Power Module PM 6040). The rake 3 is attached at either side to side walls or rake cheeks 12. The chain 4 travels in chain guide rails. In order to obtain the required accuracy, the chain 4 should be a precision transport chain, such as is commercially available from the firm Ratz, Ferlacher Förderketten, Ferlach, Austria.

Figure 4:
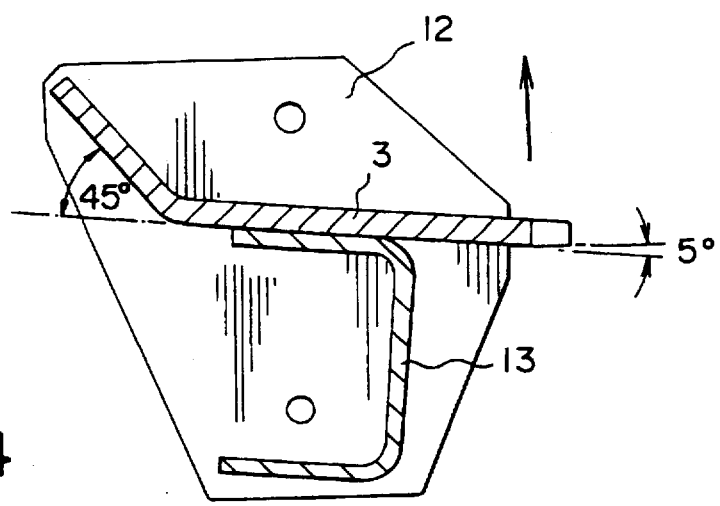
FIG. 4 is a side-elevational view thereof.

Referring now to FIG. 4, the rake plate is profiled such that it forms a upward bend of about 45°. A U-rail 13 is provided at the back of the rake plate 11, as seen in the rake travel direction (to the right in FIG. 3). The U-rail 13 is welded to the rake plate.

Figure 5:
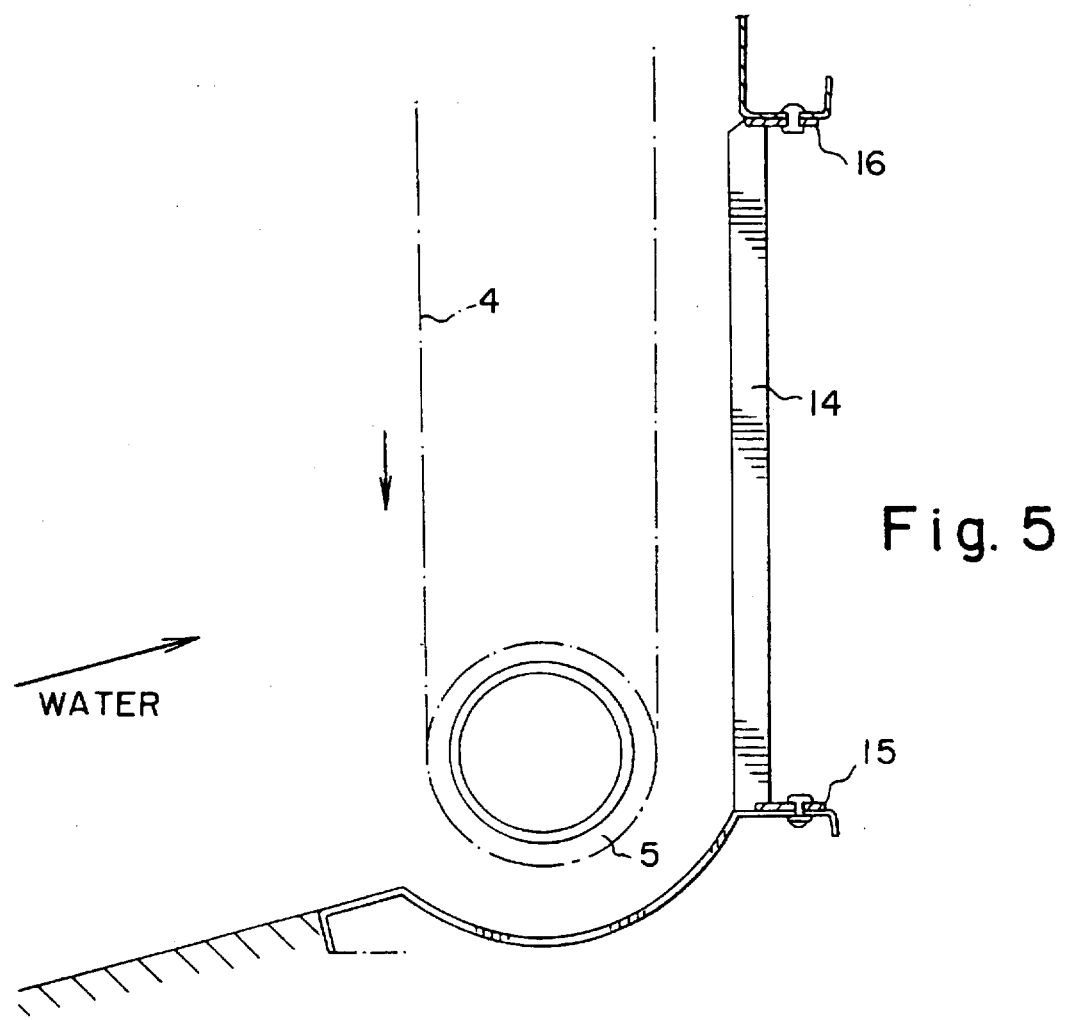
FIG. 5 is a side-elevational view of the bottom portion of the bar screen assembly.
Figure 6:
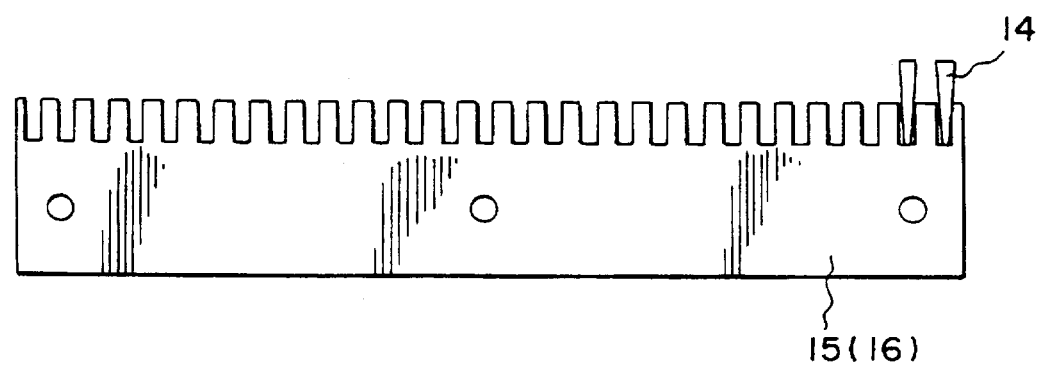
FIG. 6 is a top-plan view of a holding plate for the vertical screen bars.
Figure 7:
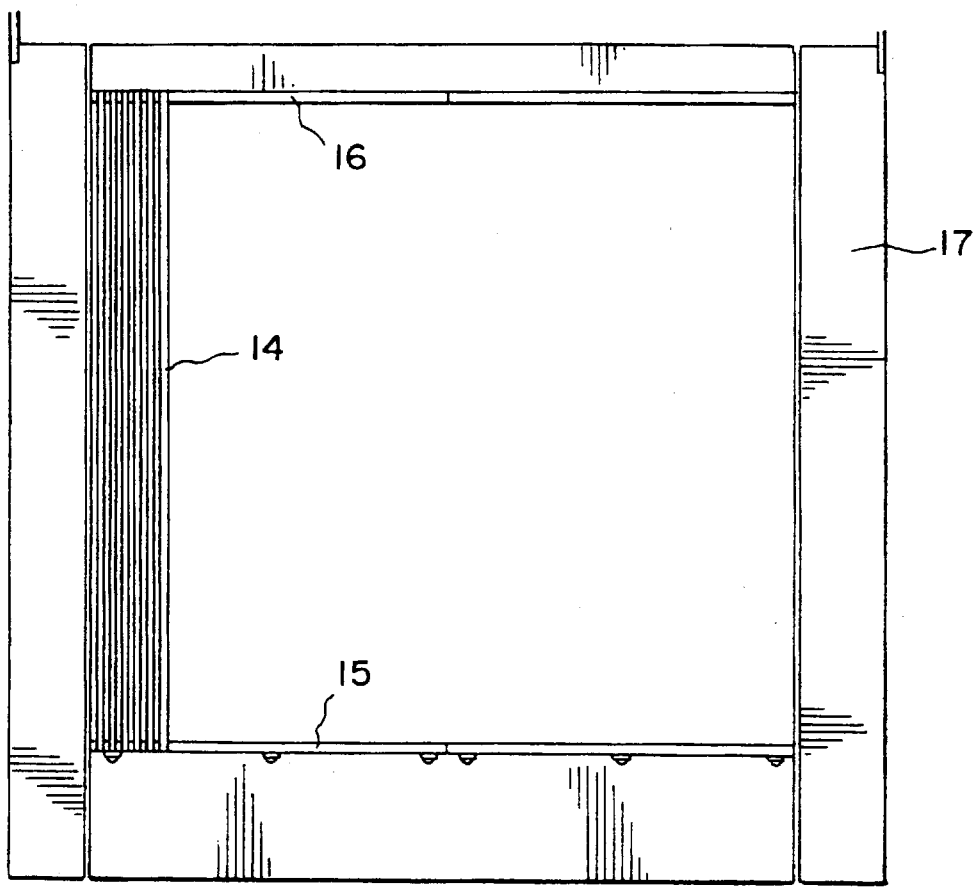
FIG. 7 is a front-elevational view of the screen, illustrating only a few screen bars.

Referring now to FIGS. 5–7, the screen 2 comprises a multiplicity of vertical screen bars 14. The cross-section of the screen bars 14 is trapezoidal, forming a leading edge which is, for example, twice the width of the trailing edge, with reference to the water flow direction. The screen bars 14 are welded to a sole plate or bottom plate 15 and into a upper screening retention plate or top plate 16. The bottom and top plates are bolted to a screen frame 17, which is not illustrated with specific detail. Depending on the width of the water channel, it is possible use several screen modules, which are formed by the plates 15 and 16 and the screen bars. If the channel depth exceeds a given material limit with regard to the free length of the screen bars, it is possible to add non-illustrated horizontal reinforcement bars extending between the plates 15, 16.

With regard to welding operations, I have typically used welding apparatus of the firm Schweiβtechnik of Austria (e.g. Migatronic/Commander BDH 320—argon mixture: S1 . . . 1% $O_2$; Migatronic/LEHF LTE 2000—welding argon 99.99%).

As indicated by the downward arrow in FIG. 5, the chain 4 travels about the lower sprocket wheel 5 in a counter-clockwise direction. The travel speeds are preferably 0.11 m/s minimum speed and 0.22 m/s maximum speed. The motor 6 is preferably a 3-phase motor, available from Elin, Austria in frame size LKM 608N01G3B-9 with a rating of 0.7/1.1 kW at 480V/50 Hz.

The gear box is commercially available, for instance, from SEW of Germany. I prefer the helical worm gear unit SA 62 LP 80 with a speed ratio of 158.08 and an output shaft speed of 8.5 and 17 rpm.

Figure 8:
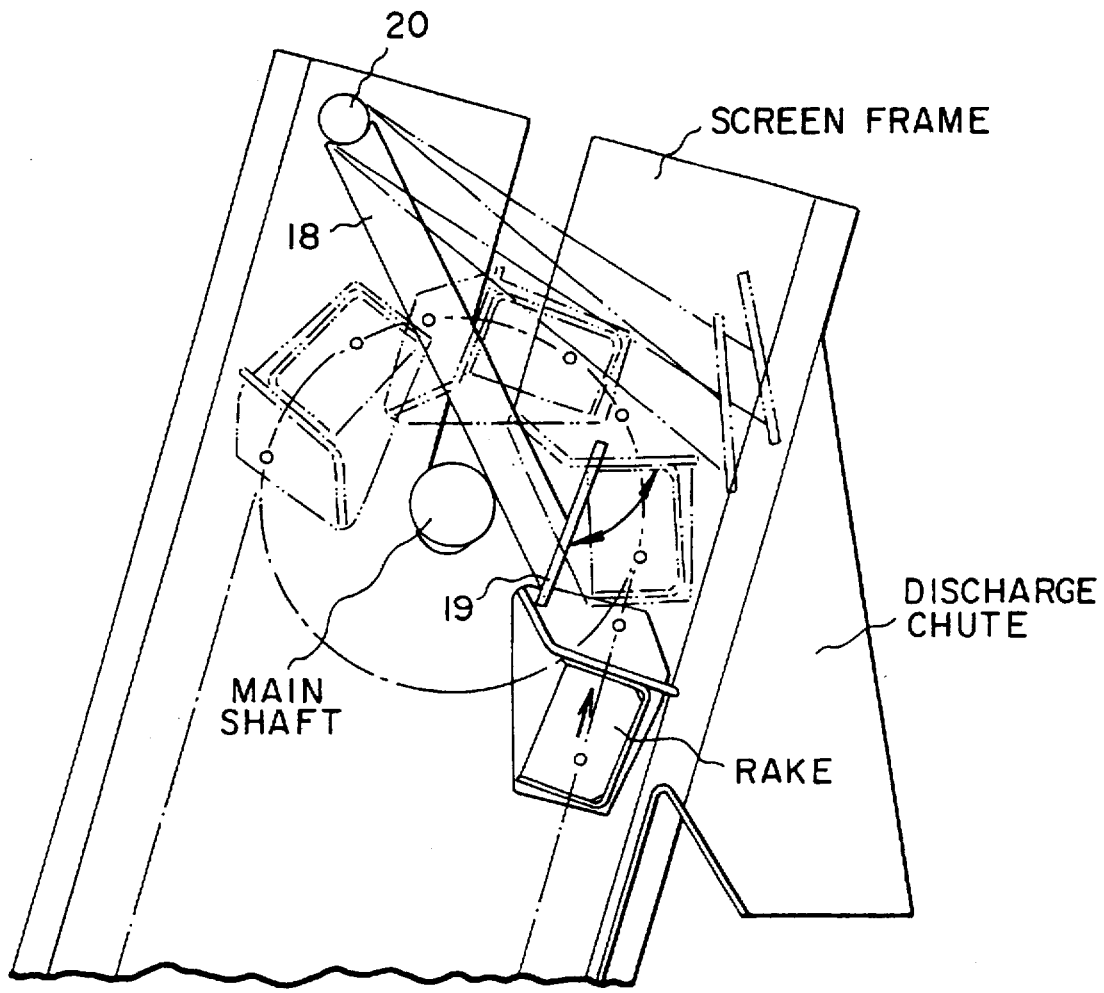
FIG. 8 is a diagrammatic side view of the top portion of the bar screen assembly, showing the scraper mechanism.

Referring now to FIG. 8, when the rake 3 reaches the height of the discharge chute 7, the screenings are scraped from the rake 3 by means of a scraper mechanism. The scraper mechanism comprises a pendulum arm 18 and a plunger plate 19. The pendulum arm 18 swivels freely in a bearing 20.

Exemplary specifications

By way of example, the frame 17 is preferably formed entirely from 4 mm thick plate and is recessed to accommodate the scraping mechanism, chain guides and idler sprockets in order to maintain the full channel width through the plane of the screen.

The frame is accurately set into position into the necessary recesses in the channel walls and it is grouted securely into place. No fixing bolts are used. The screen is set at 75° relative to the horizontal.

The frame is fully welded to the sole plate, the screen plane and to the rear screenings retention plate. It is also fully welded to the head plate, the discharge chute and the closure plate between the underside of the discharge chute and the top of the channel. At the upstream face of the screen assembly, box section cross members are securely welded to the side members or the frame at regular intervals between a point above the maximum top water level and the head of the screen. These cross members form the supports for non-illustrated removable transparent cover panels.

The upper section of the frame incorporates the screening's washwater spray bar and the necessary shrouding to eliminate the aerosol effect of the washwater system.

The bars are 25 mm deep and 5 mm thick for screens for water depths up to 1500 mm. For water depths in excess of 1500 mm the screen bars are 40 mm deep and 8 mm thick. In both cases the bars have a tapered cross section as illustrated.

The bars extend from the sole plate, to which they are individually welded, to a point 200 mm above maximum possible top water level, at which point they are individually welded to the upper screening retention plate.

Intermediate stiffening supports are welded to the screen bars as necessary for screens to accommodate water depths in excess of 2000 mm. These stiffening bars are of rectangular cross sections, 100×10 mm and they are oriented so as to present the minimum cross-sectional area against the flow in the channel. The screen bars shall be individually welded to each stiffening support.

The bottom plate is profiled to induce screenings and debris in the lower level of the flow to be directed onto the lower portion of the screen bars and no to be accumulated at the foot of the screen. The leading edge of the sole plate is at the same level as the channel floor.

Raking bars and tynes are formed from single continuous bars of sufficient depth to ensure complete stiffness across the full width of the bar. The bar has a minimum thickness of 8 mm and has tynes of the appropriate profile to suit the screen bar spacings milled from the leading edge of the same.

The raking bar tynes penetrate to within 3 mm of the root of the screen bars and leaving a gap of 7 mm between the leading edge of the screen bars and to root of the raking tynes.

The tynes form an angle of 5° to the normal to the screen bars while engaged with the same, with the ends of the tynes trailing the remainder of the raking bar.

The raking bars are attached to the drive chains within the side members of the screen frame utilizing suitably fabricated links. The raking bars are accurately aligned to ensure that for the full width of each bar the tynes penetrate the screen bars to the correct amount of the full extent of travel of the tynes while engaged within the screen bars.

Polypropylene chain guides are securely fixed to the side members of the screen frame for the full height of travel of the chains. The guides are designed to ensure that the majority of the chains are kept out of contact with the main flow as far as possible, while giving sufficient clearance for the connecting links for each raking bar.

The drive is preferably fabricated from grade 060A47 steel to B.S.970 (Part 1) 1983.

Idler sprockets are located at the lower end of each side member of the screen frame and have a minimum thickness of 20 mm. A bush housing is contiguously welded on both faces to the sprocket. The sprockets are retained on their stub axles by a suitable, easily removable mechanism to ensure ease of replacement of the bearing should this be necessary.

The drive shaft at the head of the screen frame has two chain sprockets mounted thereon generally as described above, but they are securely keyed to the shaft. The bearing for the shaft within the screen frame is self lubricating polypropylene. The bearing between the drive unit and the screen frame is a conventional roller ball-race type.

The raking mechanism is designed to ensure that any part of the screen is cleaned at least once every five seconds.

The drive unit is suitably continuously rated and is selected to match the duty of the particular screen. The drive unit is directly coupled to the screen drive shaft through the gear box.

A facility is incorporated within the drive mechanism mounting arrangement to enable the scraping mechanism drive chains to be correctly tensioned and the raking bars to be accurately positioned across the screen face. Such adjustments are possible without the dismantling of any part of the screen frame and without the necessity for any special tools.

A current sensing overload device with a built-in intelligent control facility is incorporated within the screen starter compartment in the motor control center. The device is capable of reverse the direction of travel of the scraping mechanism, should a blockage occur on the screen and cause the overload device to trip the normal operation of the screen rake. The device is also capable of enabling this reversing action to be affected for a maximum of five times for any one occurrence. Further, the device either resets automatically if the blockage causing the initial overload conditions is cleared, or, should the blockage remain upon the completion of the fifth attempt at automatic clearance of the same, the alarm is generated.

The scraper bar is fabricated and mounted so that it efficiently cleans the full width of each raking bar. The bearing for the scraper bar is self-lubricating polypropylene.

For screens which are wider than 2000 mm the damping effect of the bearings are insufficient to permit the scraper bar to return to its rest position in a smooth, steady motion without inducing any shock into the mechanism and a purpose-made and efficient hydraulic damping unit is affixed to either end of the scraper bar shaft to ensure that the returning scraper bar does not suddenly drop back into its rest position.

The assembly may further incorporate a washwater spray bar in the head of the screen to aid the cleaning of the scraper bar/raking bar interaction and also to ensure that the maximum amount of organic material is returned to the main flow of sewage.

The spray bar spans the full width of the screen and has individual nozzle jets set into its at least 150 mm centers. The jets produce a wide angle of spray in the same plane as that in which the spray bar lies and is aligned to maximize the washing of the screenings as they are scraped off each raking bar.

Washwater is delivered to the spray bar at a pressure of 16 bar and at the rate of 21/min/nozzle. A solenoid valve is fitted to the washwater line feeding the spray bar to ensure that the flow to the screen is isolated when the screen is not being operated. The washwater system should operate continuously during the operation of the screen.

A complete shroud may be fitted to the screen head to ensure that the aerosol effect of the spraying system is adequately contained.

The discharge chute is set to guide all the screening removed by the screen as efficiently as possible into the screening handling system. The chutes form an integral part of the screen assembly and also forms part of the washwater shrouding system.

Figure 9:
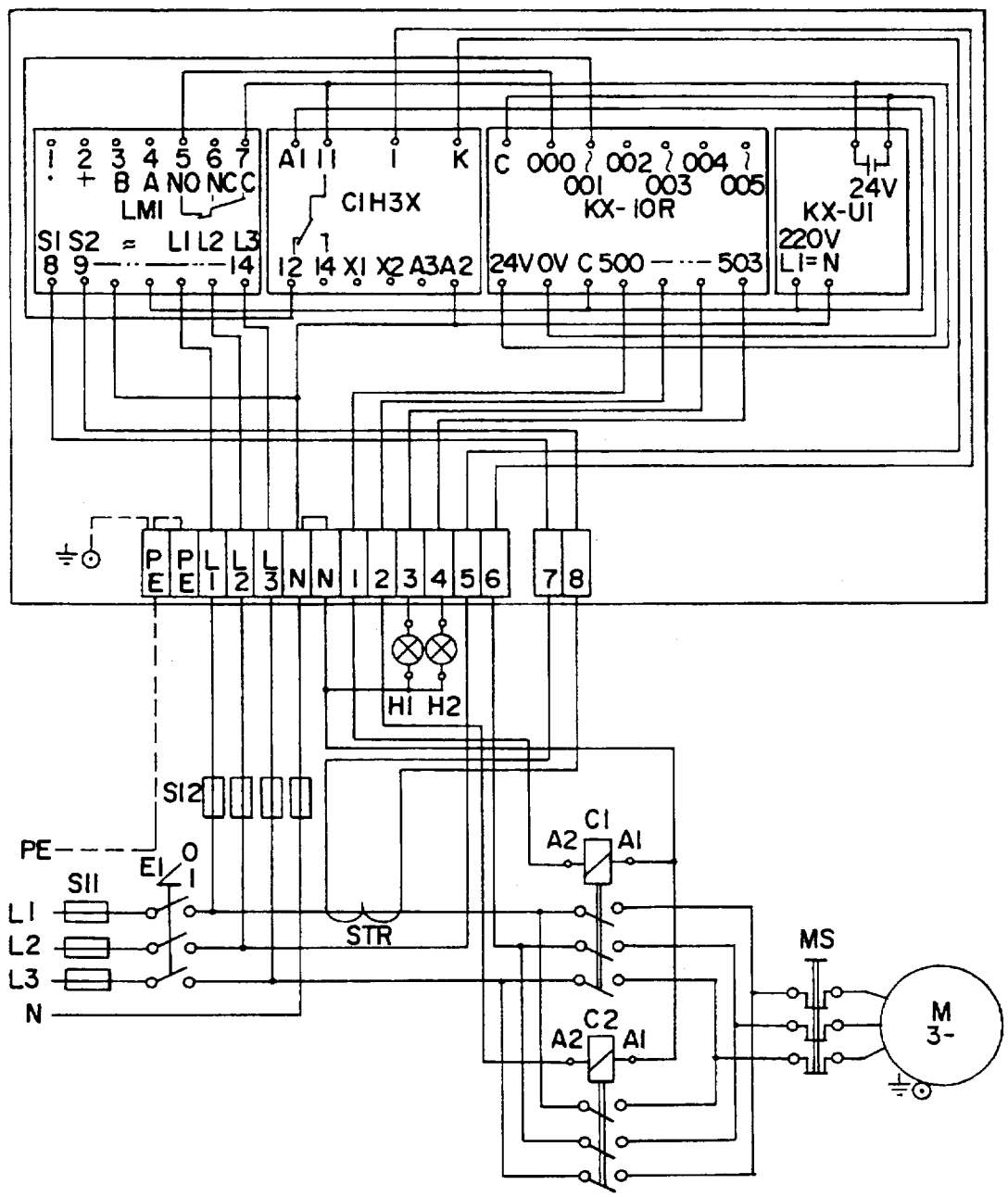
FIG. 9 is a circuit diagram showing the overload control system of the screen assembly.

Referring now to FIG. 9, which shows the overload control device, I have primarily incorporated standard components as indicated by the call letters. The reference characters outside the main box are as follows: E1 is a main switch; S1 are main fuses; S2 are component input fuses; STR is a transformer; H1 is an indicator light showing operation; H2 is an indicator light showing an error; MS is a motor protector; C1 and C2 refer to protectors for the voltages of forward and reverse operation, respectively. C1 and C2 must be mechanically coupled to one another. The control device is microprocessor controlled, for instance with an apparatus available from TeleHaase of Austria, model RW V1.0.

The following claims will refer to the screen bars as being oriented "substantially transversely" to the flow direction. It should be understood that this includes the 75° inclined orientation as shown in the drawings.

I claim:

1. A mechanically raked screen system for removing solids from a flowing liquid, comprising:

a screen of a multiplicity of mutually parallel screen bars, said screen bars being oriented substantially transversely relative to a flow direction of a flowing liquid and forming screen spaces of a given width therebetween;

a rake assembly for raking solids from said screen, said rake assembly including two endless chains traveling about sprocket wheels disposed laterally of said screen, a rake attached to and extending between said chains, said rake being oriented substantially perpendicularly to said screen and traveling with said chains for repeatedly raking said screen;

a motor driving said chains, and a sensor system connected to said motor, said sensor system determining whether or not the rake has been stopped at an obstacle by means of measuring an overload of the motor driving the chains;

means for repeatedly reversing a direction of travel of the rake until a measurement of the overload indicates that the obstacle has been removed, said rake having tynes integrally formed and protruding into said screen spaces, said rake and said tynes being formed from a single metal component.

2. The screen system according to claim 1, wherein said screen bars are trapezoidal as seen in a horizontal cross section, having a wider side thereof facing against a flow direction of a liquid flowing through said screen and tapering towards a narrower side thereof as seen in the flow direction.

3. The screen system according to claim 2, wherein said wider side of said trapezoidal screen bars have a width approximately double a width of said narrower side thereof.

* * * * *